United States Patent
Agie De Selsaten et al.

(10) Patent No.: US 12,116,790 B2
(45) Date of Patent: Oct. 15, 2024

(54) REAL SIZE TOPOGRAPHY MARKING SYSTEM

(71) Applicant: BIMPRINTER SRL, Andenne (BE)

(72) Inventors: Vincent Agie De Selsaten, Vezin (BE); Olivier Agie De Selsaten, Vezin (BE)

(73) Assignee: BIMPRINTER SRL, Andenne (BE)

( * ) Notice: Subject to any disclaimer, the term of this patent is extended or adjusted under 35 U.S.C. 154(b) by 548 days.

(21) Appl. No.: 17/184,067

(22) Filed: Feb. 24, 2021

(65) Prior Publication Data
US 2021/0180346 A1 Jun. 17, 2021

Related U.S. Application Data

(63) Continuation-in-part of application No. PCT/IB2019/055982, filed on Jul. 12, 2019.

(30) Foreign Application Priority Data

Aug. 29, 2018 (BE) .................................. 20180094

(51) Int. Cl.
*E04G 21/00* (2006.01)
(52) U.S. Cl.
CPC .................................. *E04G 21/00* (2013.01)
(58) Field of Classification Search
CPC ...... E04B 2001/3572; E04B 1/00; E04B 1/35; E04G 21/00; E04G 21/18; G01C 15/02; G01C 15/04
See application file for complete search history.

(56) References Cited

U.S. PATENT DOCUMENTS

| | | | | |
|---|---|---|---|---|
| 5,453,931 A * | 9/1995 | Watts, Jr. | ............... | G05D 1/024 180/8.5 |
| 5,755,072 A * | 5/1998 | Lingafelter | ............. | E04G 21/18 52/741.1 |
| 7,181,887 B1 * | 2/2007 | Baij | .................... | E04G 21/1891 52/243 |
| 8,087,179 B1 * | 1/2012 | Gomez | .................. | G09B 29/00 33/1 G |
| 8,533,927 B2 * | 9/2013 | Atherton | ................ | G09B 25/04 33/562 |
| 10,215,562 B2 * | 2/2019 | Ferren | ..................... | G01C 11/06 |
| 11,041,304 B2 * | 6/2021 | Schettine | .................. | E04B 1/38 |
| 11,383,276 B2 * | 7/2022 | Bonamy, Jr. | ............... | B07C 5/14 |
| 11,767,669 B2 * | 9/2023 | Churchman | .............. | E04B 1/35 52/105 |
| 2002/0005789 A1 | 1/2002 | Waibel et al. | | |

(Continued)

FOREIGN PATENT DOCUMENTS

DE 102010026102 A1 1/2012
JP H0829174 A 2/1996
(Continued)

*Primary Examiner* — Chi Q Nguyen
(74) *Attorney, Agent, or Firm* — AVEK IP, LLC; Kent R. Erickson

(57) ABSTRACT

A movable topography marking system with a movable marking system for marking in actual size at least some construction information on a construction surface, said marking system comprising at least a spraying device adapted to spray at least one painted band; an engraving laser adapted for burning said at least one painted band for marking on said at least one painted band construction information; and at least one positioning topographic prism.

21 Claims, 7 Drawing Sheets

(56) References Cited

U.S. PATENT DOCUMENTS

| | | | | |
|---|---|---|---|---|
| 2008/0010910 A1* | 1/2008 | Baij | ........................ | E04B 2/706 |
| | | | | 52/105 |
| 2008/0250657 A1* | 10/2008 | Bianchin | ................. | B27F 7/155 |
| | | | | 33/16 |
| 2009/0277031 A1 | 11/2009 | Stocking | | |
| 2013/0255056 A1* | 10/2013 | Atherton | .................. | G01B 3/00 |
| | | | | 33/562 |
| 2020/0338580 A1 | 10/2020 | Herget et al. | | |
| 2022/0404818 A1* | 12/2022 | Stock | ............... | G05B 19/41815 |

FOREIGN PATENT DOCUMENTS

| | | | |
|---|---|---|---|
| JP | 2001289638 A | 10/2001 | |
| JP | 2007118165 A | 5/2007 | |
| WO | 2017093779 A1 | 6/2017 | |
| WO | 20200219728 A1 | 10/2020 | |

* cited by examiner

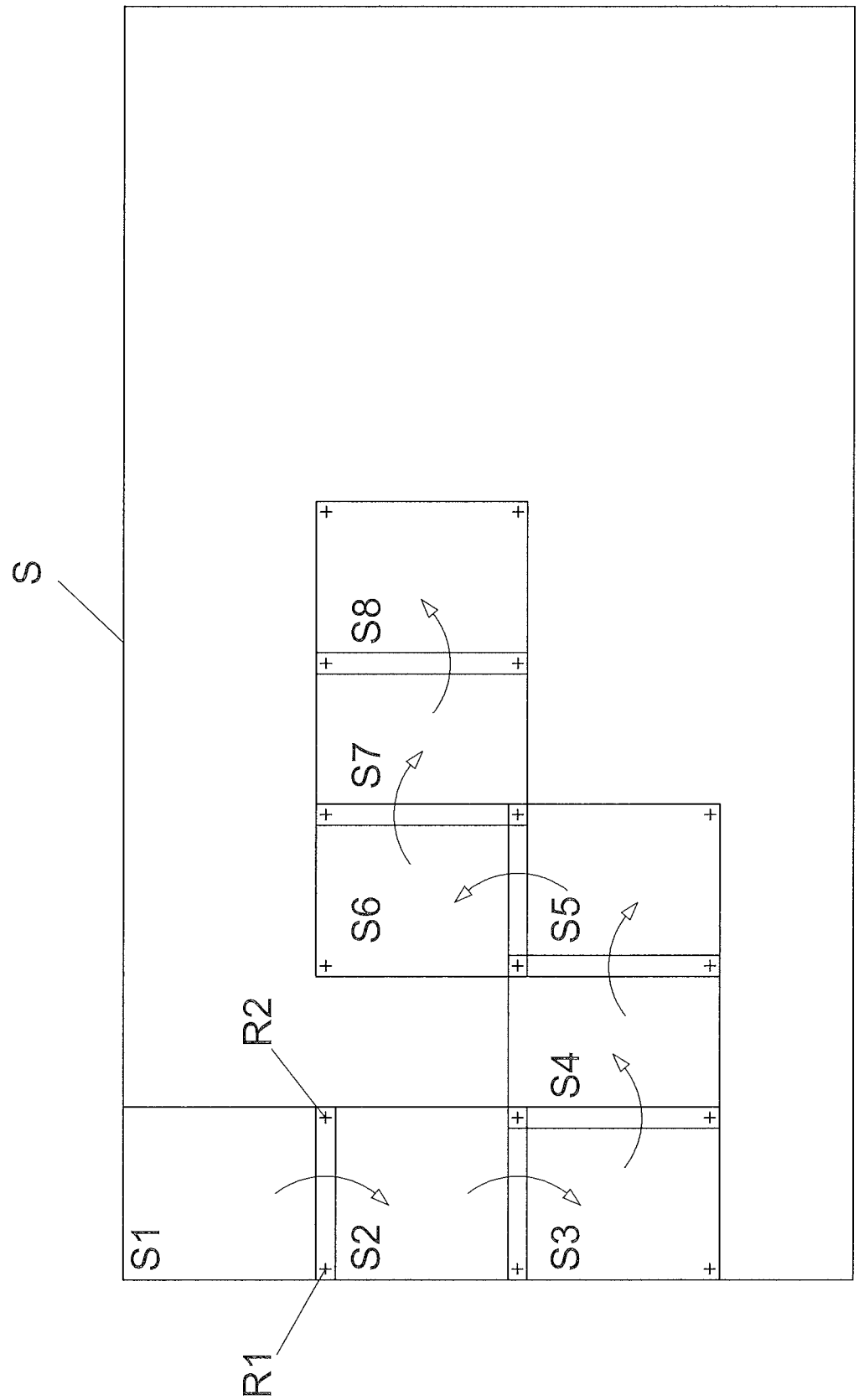

REAL SIZE TOPOGRAPHY MARKING SYSTEM

CROSS-REFERENCE TO RELATED APPLICATIONS

The present application is a Continuation-in-Part application of PCT patent application PCT/IB2019/055982 filed on Jul. 12, 2019 and published on Mar. 5, 2020 under number WO2020/044138, claiming the benefit of the priority of Belgian Patent application No BE2018/0094 filed on Aug. 29, 2018, and granted on Sep. 24, 2019 under publication number 1026046.

FIELD OF THE INVENTION

The present invention relates to a topography marking system of the robot type bearing a marking system, the said robot being movable on the construction surface for marking topographic information.

BACKGROUND OF THE INVENTION

At the time a building construction design is started off, many plans are actualised for example to show the locations of distinct different circuits.

Although computer 3D views could reveal many possible issues and problems, it appears that during the on-site construction phase, one or more particular problems arise.

One such issue arises for example during casting of the concrete floor slab for supporting the building to be erected, including vertical concrete elements and walls. Any errors related to the concrete slab dimensions can generate a cascade of problems that will only be noticed after starting the concrete slab construction.

Also, during the construction phase the workers place the horizontal concrete slabs followed by placing the vertical elements (walls, columns, screens, etc.)

Between these two important steps, a certified topographic surveyor is required on site, for tracing principal reference points on the concrete slabs. This is done with the help of a topography station (Electronic Theodolite), Topography prism, spray colour bombs and a scriber. Thereafter, taking into consideration the marked principal reference points, several "marking" workers mark the construction plan details of the floor to the concrete slab with the help of the plans, measuring tapes and ropes. Once this human marking step is completed, the construction or the placement of the vertical slabs on the concrete floor can start. The above cycle repeats itself for each floor of the building.

The above explained procedure requires a lot of time, with common marking errors occurring particularly due to the intervention of several marking workers and human reading errors.

An attempt was made to try marking the installation position on the building slab using a marking device that received architecture information directly from a computer.

Such a marking device is for example taught by the document U.S. Pat. No. 5,755,072. This marking device is a marking robot consisting of a actual size tracing system for a construction site, where the robot is made of
- rigid and non deformable large porch-structure that spans the tracing area.
- a colour spray head
- a system for moving the spray head along two perpendicular directions
- an electronic device controlling the position of the porch-robot with respect to reference points.

The robot of U.S. Pat. No. 5,755,072 comprises:
(a) a frame adapted to form a rigid non deformable frame,
(b) a marking system comprising a spraying device for spraying a painting composition suitable to be burnt, possibly after partial or complete drying or curing, on said construction surface, so as to paint on said construction surface at least one painted band, and
(c) a moving support for the marking system, said moving support being mounted on the frame, and being adapted for ensuring movements of the marking system with respect to the frame, in at least two perpendicular directions.

Such marking device needs to know forehand the reference points and does not permit marks with a high degree of precision, nor marks to be impacted by external conditions, like wind or air currents.

The document JP 2001 289638 discloses a robot with a platform mounted on continuous tracks, the device enabling the movement of basic tool to a given position.

The document US 2002/005789 discloses a marking device with a liquid spraying head for spraying a liquid onto a given surface, the device position correction being operated during the marking operation.

To avoid the issues seen during marking operation on a concrete slab, due to lack of precision, document US2009/277031 proposes to print in actual size the plan on many rolls and attach the rolls to the slab. The position and fixation of the rolls is not easy and the rolls are prone to wear and tear, so that the marks may no longer be viewed. In addition, the rolls form a layer that hinders a good grip for the hydraulic binders. This marking issue in actual size and on site has not been solved until now.

Hence, the document WO2017/093779 proposes to project on the concrete slab the graphic information. The system is complicated to use and does not take into account the surface covered by the projector. Such a system is only reliable for flat and horizontal surfaces, with a vertical projector.

SUMMARY OF THE INVENTION

The Invention relates therefore to a topography marking system for topographic marking in actual size on a site construction surface, enabling precise marking, by carrying out marking of successive areas.

The Invention relates to a topography marking system E for marking in actual size at least some construction information on a construction surface, said system E comprising at least:
(a) a frame 1 adapted to form a rigid non deformable frame,
(b) a displacement system 2 for moving the frame 1 relative to the construction surface,
(c) a marking system with at least a topographic prism,
(d) a moving support 20 for the marking system, said moving support 20 being mounted on the frame 1 or on an element thereof, and being adapted for ensuring movements of the marking system with respect to the frame, in at least in a substantially horizontal plane, like in two perpendicular directions X,Y,
in which said marking system comprises at least:
a spraying device 5 for spraying a painting composition suitable to be burnt, possibly after partial or complete drying or curing, on said construction surface, so as to paint on said construction surface at least one painted band, and an engraving laser 6 for burning the said at least one painted band for marking on the said at least one painted band some construction information.

This system allows a precise marking on the construction surface S, for example of the position of a vertical median plan of a wall, or the position of a vertical plan of an exterior wall, like the position of the exterior face, etc.

The moving support 20 for the marking system 4 is advantageously mounted movable relative to the frame 1 by a moving system 3, 3A, 3B associated to the frame 1 or to an element thereof, said moving system 3, 3A, 3B being adapted for ensuring movements of the marking system (4) with respect to the frame 1, within a substantially horizontal plane X, Y.

The marking system 4 comprises advantageously at least:
a spraying device 5 which in spray operation is adapted for spraying a painting composition suitable to be burnt, on said construction surface, so as to be able to paint on said construction surface at least one painted band;
an engraving laser 6 which in a burning operation is adapted for directing laser beam for burning the said at least one painted band for marking on the said at least one painted band some construction information; and
at least one topographic prism 7.

Advantageously, the displacement system of the frame comprises at least one electric motor, while means for moving the support comprises also one electrical motor, while the marking system bears at least one electric battery, advantageously of the rechargeable type, for supplying the electric motors of the displacement system or moving means of the frame and support.

The system of the invention is in this way advantageously of the autonomous robot type.

According to advantageous particulars of embodiments of the system of the invention, the system of the invention has one or more of the following characteristics, in particular a combination of two or more of said following characteristics:

the displacement system 2 for moving the frame 1 at least partly on the construction surface comprises at least one electric motor 2A, 2B, 2C, while the moving support 20 comprises at least a displacement means of support 20 provided with at least one electric motor 3A, 3B, the topography marking system E is provided with at least one electric battery 11, advantageously suitable to be recharged, for supplying energy to the said at least one electric motor of the displacement system 2 and the said at least one electric motor of the moving support 20.

The topography marking system comprises an electronic command system 12 to command a series of different marking functions and advantageously moving functions, said electronic command system 12 being associated with a wireless communication means for receiving information at least relating to the position of the system or part thereof on the said construction surface S.

The spraying device 5 comprises a spraying head adapted to spray on the construction surface a painted band of width less than 5 cm, advantageous comprised between 0.5 and 2 cm, while the engraving laser 6 comprises a head to engrave on the painted band, at least points and/or lines with thickness of less than 1 mm.

The electronic command system 12 is programmed to prevent the functioning of the engraving laser 6 and the spraying device 5 during the displacement of the frame 1 on the construction surface S, and to prevent the functioning of the engraving laser 6 during the functioning of the spraying device 5.

The topography marking system E comprises a series of security means sending signals to the electronic command system 12 at least to stop or prevent the functioning of the engraving laser 6, and advantageously also to stop or prevent the functioning of the spraying device 5, the said security means being advantageously selected from the group comprising:

a distance detector 100 for detecting the distance between, on one hand, the topography marking system E or a part of thereof, especially the engraving laser 6, and, on the other hand, the construction surface S;
one or more cameras or sensors 101 for detecting the presence of at least an object on a zone of the construction surface to be marked;
a smoke detector 103;
an inclination detector 104 for detecting the inclination of the frame 1 with respect to the horizontal plan;
an Inclination or tilt detector 105 for detecting the inclination or tilt of the engraving laser 6 with respect to the vertical axis;
a motion detector 106 for detecting motion of the frame;
an infrared detector 107;
a detector 108 for detecting the presence or movement of an object, person or animal at least within a distance of less than 2 m from the frame 1;
a fault detector 109 for determining at least one fault in the electric circuit and/or in the electronic circuit 12 and/or in one of the motors 2A, 2B, 2C, 3A, 3B;
a current leakage detector 110 with advantageously a series of electric fuse protectors.
a wind detector 111; and
a protection cover opening detector 112, advantageously determining the possible pivoting of the protection cover 113 from a safe cover protecting position, and any combinations thereof.

The moving support 20 of the marking system 5, 6 is moveably mounted in relation to the frame 1 in at least two perpendicular directions between them X, Y in the manner to cover a substantially rectangular marking zone, with its sides of at least 0.2 m, advantageously at least 1.5 m, said substantially rectangular marking zone covering a potential marking surface of minimum 0.4 m², advantageously at least 1 m².

The moving support 20 of the marking system comprises at least one positioning camera 101.

The displacement system 2 for moving the frame 1 comprises at least a series of wheels or rollers, at least three of which being each driven by an electric motor.

The moving support 20 of the marking system is moveably mounted in translation to a first direction X on a rail 3, which is moveably mounted in translation with respect to the frame 1 in a second direction Y perpendicular to the first direction X.

The moving support 20 of the marking system comprises a carriage moveably mounted on a rail 3 defining a vertical plane V1 (Symmetric plane of the rail) when the frame 1 is substantially horizontal, the said carriage in relation to this vertical plane V1 defined by the rail, having, on one side, the engraving laser 6 with the topographic prism 7 supported above the engraving laser 6, and in that the spaying head of the spaying device 5 is placed under the rail 3, and displaced laterally with respect to the engraving laser 6.

The engraving laser 6 comprises a laser beam guiding tube 60 for guiding the laser beam generated by the engraving laser 6 towards the construction surface (S).

The moving support 20 is equipped with at least two laser distance detectors 102 that allow scanning of a horizontal area for detecting possible existing obstacles on or around a marking zone of the construction surface.

The frame 1 is provided or associated along one of its edges, with a structure provided with at least a paint reservoir 200 for the painting composition suitable to be burnt, as well as advantageously one or more batteries 11 to supply electric power to the electric motors, so as to position the centre of gravity of the whole topography marking system toward one of its edges, the latter being advantageously associated to a first wheel or continuous track driven to move by at least a first electric motor 2A, and to a second wheel or continuous track driven to move by at least a second electric motor 2B, the first wheel or track being distant from the second wheel or track.

The frame 1 is protected by a protecting hood or cover 113.

The topography marking system comprises a displacement rail 3 for the support 20, said displacement rail 3 being attached to a rotation system 300 enabling at least the support to move around at least part of the frame 1.

One of the two or more combinations of these characteristics or particularly the total of all above characteristics.

The invention relates also to a process for marking in actual size at least some construction information on a construction surface, in which one or more topography marking systems of the invention as disclosed here above is/are used for spraying a painting composition suitable to be burnt on said construction surface, so as to paint on said construction surface at least one painted band, and for burning thereafter the said at least one painted band for marking on the said at least one painted band some construction information.

According to an embodiment of the process of the invention for marking in actual size at least some construction information on a construction surface by at least one topography marking system, the process is using one or more topography marking systems comprising each at least:

(a) a frame 1 adapted to form a rigid non deformable frame,
(b) a marking system 4,
(c) a moving support 20 for the marking system 4, said moving support 20 being mounted movable relative to the frame 1 by a moving system 3, 3A, 3B associated with the frame 1 or to an element thereof, said moving system 3, 3A, 3B being adapted for ensuring movements of the marking system 4 with respect to the frame 1, within a substantially horizontal plane X,Y,
(d) a displacement system 2 for moving the frame 1 relative to the construction surface S, in which said marking system 4 comprises at least:

(e) a spraying device 5 which in spray operation is adapted for spraying a painting composition suitable to be burnt, on said construction surface, so as to be able to paint on said construction surface at least one painted band;
(f) an engraving laser 6 which in burning operation is adapted for directing laser beam for burning the said at least one painted band for marking on the said at least one painted band some construction information; and
(g) at least one topographic prism 7, in which the topography marking system further comprises at least a control system for controlling the working of the moving system, the working of the displacement system, the spray operation of the spraying device, and the burning operation of the engraving laser.

The said advantageous process comprises at least the following steps:

sending information to the topography marking system on the construction information to be marked on a series of marking zones of the construction surface, moving the frame 1 of the topography marking system successively from one marking zone of said series of marking zones to another marking zone of said series of marking zones, in accordance to the information sent;

when the frame 1 is located for defining one marking zone of said series of marking zones, moving the moving support 20 with the marking system on the construction surface, while controlling first the spray operation for painting on said one marking zone at least one painted band and then the burning operation by the engraving laser by directing the laser beam onto said at least one painted band for marking construction information on said at least one painted band of said one marking zone.

When using a series of topography marking systems of the invention, different marking zones of the construction surface or concrete slab cab be printed or marked simultaneously, meaning then a reduced total time required for printing the whole construction surface or floor.

Advantageously, the spray operation is controlled for spraying at least one painted band with a width less than 5 cm, while the burning operation is controlled for burning on said at least one painted band, at least one element selected from the group consisting of points with a diameter of less than 1 mm and lines with thickness size of less than 1 mm.

Preferably, the at least one topography marking system comprises at least one security means selected from the group consisting of:

a distance detector 100 adapted to determine a distance parameter between, on one hand, the topography marking system E or a part of thereof, and, on the other hand, the construction surface S;

at least one detecting means 101 selected among cameras and sensors adapted for detecting the presence of at least an object on a zone of the construction surface S to be marked;

a smoke detector 103 adapted for detecting smoke generated by a burning operation;

an inclination detector 104 adapted for determining an inclination parameter of the frame 1 with respect to a horizontal plan;

an inclination or tilt detector 105 adapted for determining a position parameter of the engraving laser 6 with respect to a vertical axis;

a motion detector 106 adapted for determining the movement of the frame 1;

an infrared detector 107 adapted for determining the presence of a heat source or a reflecting element;

a detector 108 adapted for detecting the presence or movement of an object, person or animal at least in a zone within a distance of less than 2 m from the frame 1;

a fault detector 109 adapted for determining at least one fault selected among the group a fault in an electric circuit, a fault in the electronic circuit 12, a fault in the moving system 3,3A,3B, a fault in the displacement system 2, and combinations thereof;

a current leakage detector 110;
one or more electric fuse protectors;
a wind detector 111; and
a protection cover opening detector 112, and combinations thereof.

Whereby when the at least one security means determines a security risk, the said at least one security means emits at least one security signal to the topography marking system selected among the group consisting of a security signal for stopping a burning operation by the engraving laser 6, a security signal for preventing a burning operation by the engraving laser 6, a security signal for stopping a spray operation by spraying device 5, a security signal for preventing a spray operation by the spraying device 5, and combinations thereof.

Advantageously, when using a series of distinct topography marking systems of the invention, when security risk is determined by a security means of one topography marking system, a signal is sent to the other working topography marking systems for stopping further working of said other topography marking systems.

The particularities and details of preferred embodiments of this invention, given as examples only, will appear from the following description, in which reference is made to the attached drawings.

BRIEF DESCRIPTION OF THE DRAWINGS

FIGS. 6 and 6A are schematic diagrams representing successive working marking steps with the device according to FIG. 3.

DESCRIPTION OF PREFERRED EMBODIMENTS ACCORDING TO THE INVENTION

Figure 1:
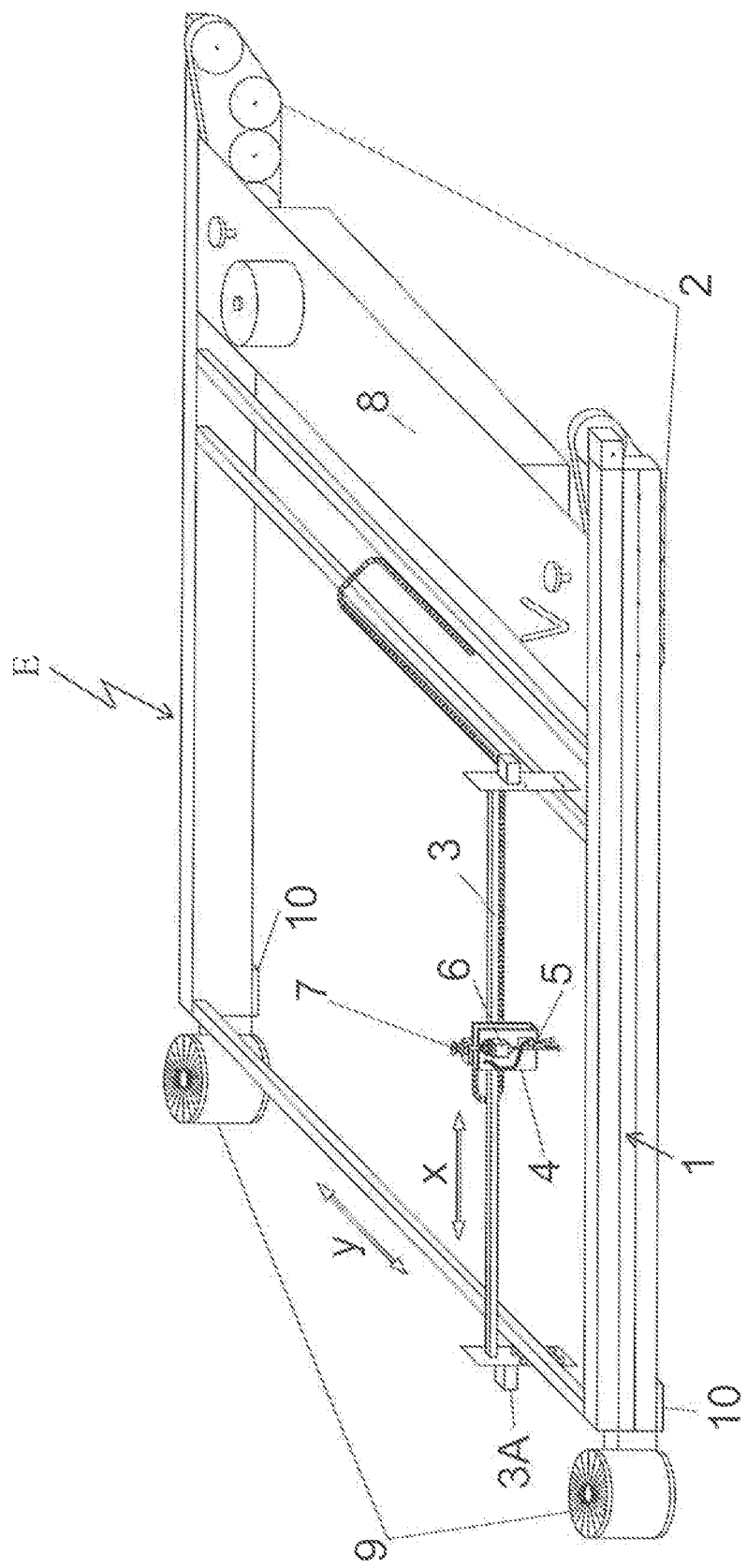
FIG. 1 is a perspective view of a first embodiment of a system according to the invention.

The topographic printer or marking system of FIG. 1 is a actual size topographic printer for a building. The topographic marking system of FIG. 1 comprises a rigid and non-deformable braced frame 1 made of light metal or metallic alloys, an autonomous movable system 2 (comprising wheels or rollers or continuous tracks, one or more of which being associated to a driving system, for example with an electric motor) allowing the movement of the marking system over the entire surface to treat or to mark, an internal displacement device 3 enabling a movement in plane like in two orthogonal directions X and Y for the printer head 4, a printer head 4 composed of a sprayer 5 for a narrow paint or liquid band that can be burnt, and an engraving laser 6.

On the printer head 4 a prism support and topography prism 7 are placed. In the front side of the frame is a box 8 that contains the electronic cards, battery, communication system and spraying paint stock reserve.

At the rear of the frame 1 two motorised hovercraft turbines 9 are used to provide lift to raise the rear of the frame, when required. The turbines are driven in rotational movement when the device advances, thereby facilitating the movement of the marking system on a building floor or surface. Once the device is in place over an area to be printed or marked, the turbines stop working and the frame is supported on its legs 10.

Figure 2:
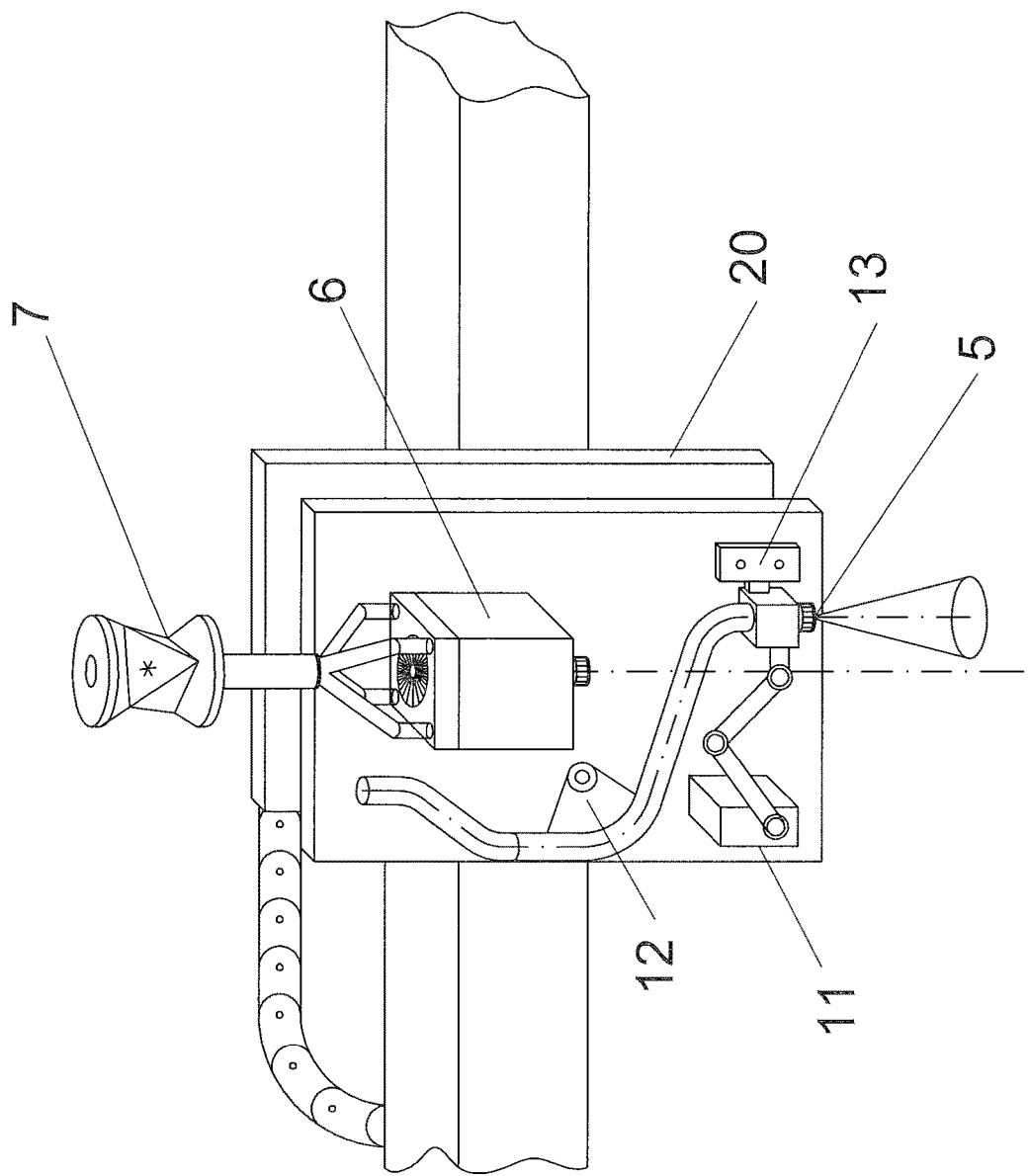
FIG. 2 is a more detailed perspective view of the printer head or marking system of the first embodiment of FIG. 1.

FIG. 2 is an enlarged perspective view of the printing head of the printer or marking system of FIG. 1. Said printing head comprises at least a sprayer adapted for spraying a narrow paint band or a narrow liquid band comprising at least a compound or material (able to be sprayed on the area to be marked) that can be burnt by a laser 6 and the engraving laser 6. On the printing head, a prism support and a topographic prism 7 are mounted. A servo motor 120 permits to trigger or halt the spraying system giving way to the laser engraving system. It operates by rotation on the pivot 12.

The movement of the marking system on the building floor or surface is guided by the topographic total station. To do so, once the marking device with a frame defining a rectangular printable area is substantially correctly positioned, on the floor or ground level, instructions will be given by the electronic command system 120 for displacing the printer head to the four extreme corners of the rectangular printable area defined by the frame 1. The software will compare the readings measured by the entire topographic station and the coordinates X, Y measured from the displaced printer head. The software calculates the change from the coordinates X,Y using the Helmert Transformation Method (the Helmert transformation method is widely used in practice so that the estimated coordinates in a desired frame will have the smallest error variances. Such an approach is disclosed in "The Helmert Transformation approach in network densification revisited", C. Kotsakis et al, conference paper, October 2014). It then sends a G-code file (Tracing file) to the printer.

The invented topography printer (called hereafter "Robot Topo") is intended to help and improve tracing steps of a topographic surveyor and the "Tracing" workers by printing the complete plan on a slab or floor to the actual scale of 1/1. It allows a direct link of the computerised plan or model of the BIM (Building Information Model) to its 1/1 scaled layout on the cast concrete slab. To do so the drawing software breaks down the tracing zone in rectangular areas, advantageously successive areas, with a size corresponding to the printing size of the printer, i.e. substantially the size of the frame of the printing system (so as to have preferably some partial overlapping for two successive areas to be printed). The printer traces marks within a rectangular zone. Then it moves automatically to the next rectangular zone to be marked.

The whole topography station measures and calculates in actual time the 3D position of the robot's prism. A computer receives the position and guides the robot in an autonomous way on the site. The high precision laser tracer helps the printing of the construction plan given by computer aided design software (CAO) directly to a scale of 1/1 onto the cast or freshly cast concrete slab. As the weight of the printing system is limited, the printing system can be moved on a not fully hardened concrete slab, without forming traces due to the wheels or continuous tracks.

A remote operator commands the Robot Topo either from the working site or from its office. This office can be situated anywhere. The Robot Topo can work continuously, without interruptions, 24 hours a day, 7 days a week, with reloading phases when required (quick filling, filling by container replacement like for paper printer or in continuous during a marking step. The filling and battery reloading can be operated from a filling/reloading station (possibly separated stations) with the required tube and connections for filling the liquid paint/marking material reservoir(s) and/or with an electric connecting system for quick re-load of the electrical battery/batteries. In case the re-load of the battery is time consuming, a discharged battery can be replaced by charged one).

The remote operator loads the actual current plan on the computer (in DWG, DNG format from a computer-aided design software (CAD)) or from a file format IFC from the BIM server (Building Information Model) for the floor being built. Adjustment to the quotation, texts, customized notations/annotations, parameters is done to extract the plan for the 1/1 scale.

Once the floor concrete slab of that level is placed by the on-site technical workers, the system of the invention, Robot Topo, is put on a support placed on the freshly (not fully hardened) cast concrete slab (Parking). With the invention, it is not required to wait for the full hardening of the concrete slab for operating the printing system so as to ensure the printing operations.

The Robot Topo is not put into use till the concrete has set to allow smooth displacement without any blocking risk (concrete sufficiently hardened for enabling movement of the wheels or continuous tracks of the system of the invention on the cast concrete).

When the remote operator sends a command signal to the Robot Topo for positioning itself to one of the site ends to start the marking/tracing operation with the help of the precision laser, the system of the invention is in stand-still mode and the topography station gives the position to the remote operator.

The tracing/marking software extracts the relevant file containing all information of the rectangular zone located under the mobile part of the Robot Topo. The software then generates an instruction file, for example in the GCODE format (G-code), which is transmitted to the marking system.

The Robot Topo makes a first move by depositing a colour jet and a second move with the laser tracer/marker. The text, metric information, lines, points; symbols are all traced/marked to the highest precision on the fresh slab (not fully hardened).

Once this trace/marking is effectively done on a rectangular zone, the Robot Topo moves to the next position. The cycle therefore repeats until the complete surface is treated/marked as specified on a construction file and/or plan.

The topographic printer controlling software can also do part of remote operator's job thus allowing him to carry out remote work at the same time on other construction sites. The remote operator benefits from a complete training and can work from a remote office, whereby the operator can be a physically challenged person, thus enabling his better integration in a working sector considered as physically demanding.

If the printing device is externally supported, it can be used to print on vertical elements and also under horizontal elements (example ceilings). In such a case an operator must manually place the printer device, maintain its place and move it from one zone to another.

In use of the topographic printer outside, the prism 7 can be replaced by a series of integrated signal receptors GNSS RTK that calculates in actual time the printer head position.

Figure 3:
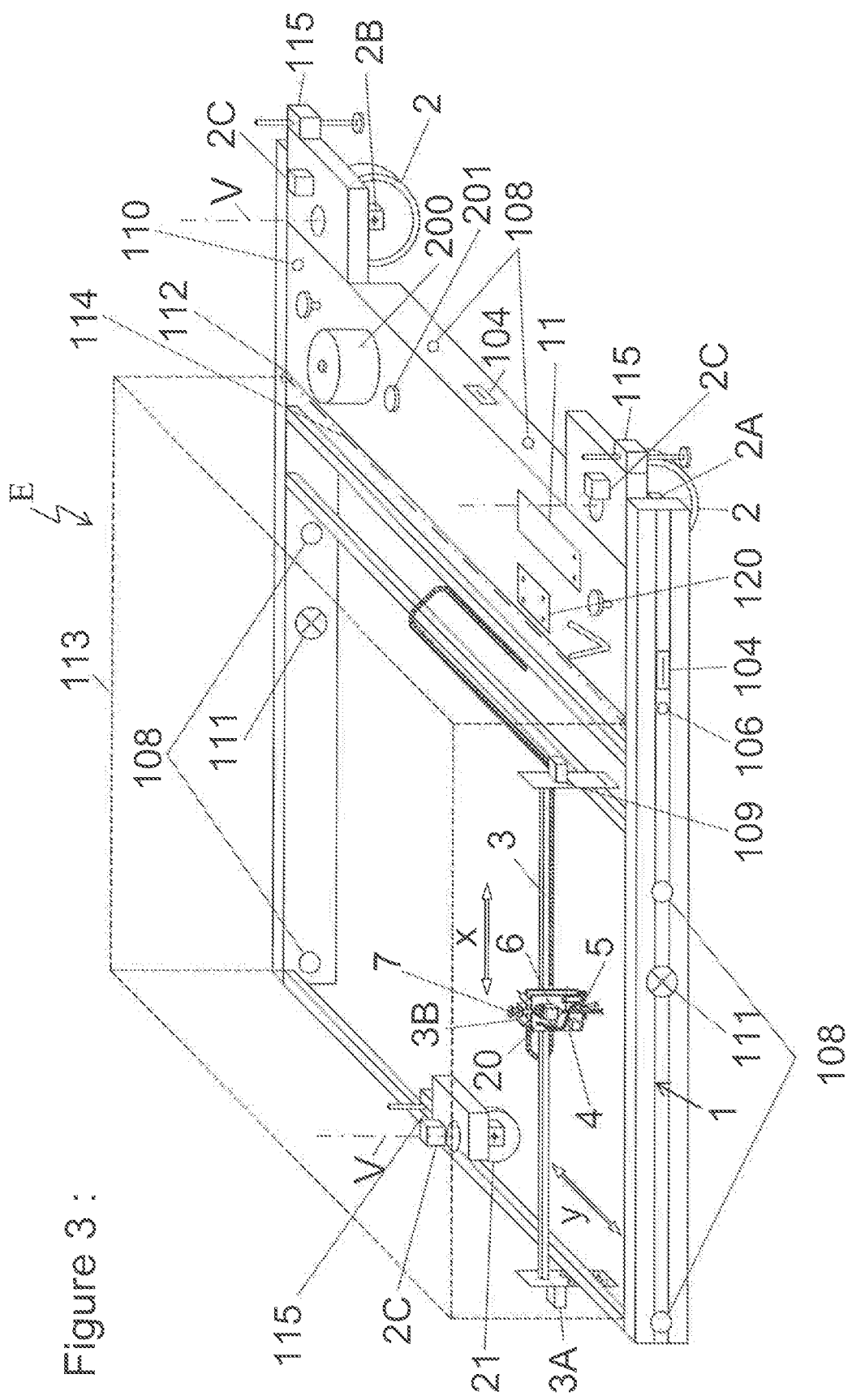
FIG. 3 is a perspective view of another embodiment of the system according to the invention.

The printer of the invention as shown in FIG. 3 comprises a system E for actual size topography printing on the surface of a construction site, said system E having at least a non deformable mobile frame 1, a displacement system 2 for moving the frame with respect to the site considered, a marking system with a topographic prism, a support 20 for the movable marking system with respect to the frame in at least two perpendicular directions X, Y, in which this marking system 6 comprises at least a spraying device 5 for spraying a liquid or paint band able to be burnt, and a engraving laser 6 for submitting a portion of the sprayed band (on the site surface) by the spraying device 5 to a burning step.

The displacement system 2 of the frame 1 comprises at least one or more electric motor (2A, 2B for example for the front-end wheels), while the means for moving the support 20 with respect to the frame 1 also has at least one electric motor 3A, 3B. The system has at least one electric battery 11, advantageously of the rechargeable type, to supply the above-mentioned electric motors 2A, 2B of the displacement system 2 of the system E comprising the frame 1 and of the support 20 with printer head. The said support 20 is moveably mounted on a rail 3 (direction X), while the rail 3 is moveably mounted with respect to the frame 1 (direction Y perpendicular the direction X). The movement of the support 20 along the rail 3 is controlled by a motor 3B (direction X), while the movement of the rail 3 is controlled by the motor 3A (direction Y). The support 20 with the printer head 4 (with the spray system 5 and the marking system 6, and the topographic prism 7) can be moved at the four corners of the rectangular or square frame 1, by controlling the driving movement of the motors 3A,3B.

The system E comprises an electronic command system 120 (placed in the box 8; electrically supplied by battery 11) to command different functions of the electronic system 120 that is associated with wireless communication means (for facilitating its working as an autonomous robot), to receive information at least with respect to the position of the system E on the construction site considered.

The spraying device 5 comprises a spraying head adapted for spraying on the construction site surface a paint band with width less than 5 cm, advantageously comprised between 0.5 cm and 2 cm, while the engraving laser has a engraving head to mark on the band, points or lines with a thickness size of less than 3 mm, advantageously from 0.1 mm to 0.8 mm.

The electronic command system 120 is programmed to prevent the engraving laser 6 and the spraying device 5 to function during displacement of the non-deformable mobile frame 1 (so during the driving of the motor 2A and 2B) and to prevent the graving/marking by the engraving laser 6 during the functioning of the spraying device 5, whereby ensuring a certain time period between the spraying step and the laser engraving/marking, so as to ensure some drying/curing of the paint or resin applied on the surface (such as concrete slab) prior its burning by the laser 6.

It has been observed that the laser marking step after some drying of the sprayed paint or resin band ensures an increased and fast adhesive zone for at least a portion of the sprayed paint band. This is useful when the concrete slab is subjected to poor weather conditions.

The displacement system at the rear end of the frame 1 has one wheel 21 pivoting around a vertical axis V, with its orientation being controlled by the motor 2C. This enables a better control of the direction of the movement of the frame from a marked zone towards an adjacent zone to be marked.

At the front end of the frame 1 two wheels form the displacement system 2, the wheels pivoting also around vertical axes V. These two wheels are motorized, i.e. meaning that they are each associated with motors 2A and 2B respectively. The orientation of each wheel is controlled by motor 2C. Each wheel may have a different orientation compared to the other.

Figure 4:
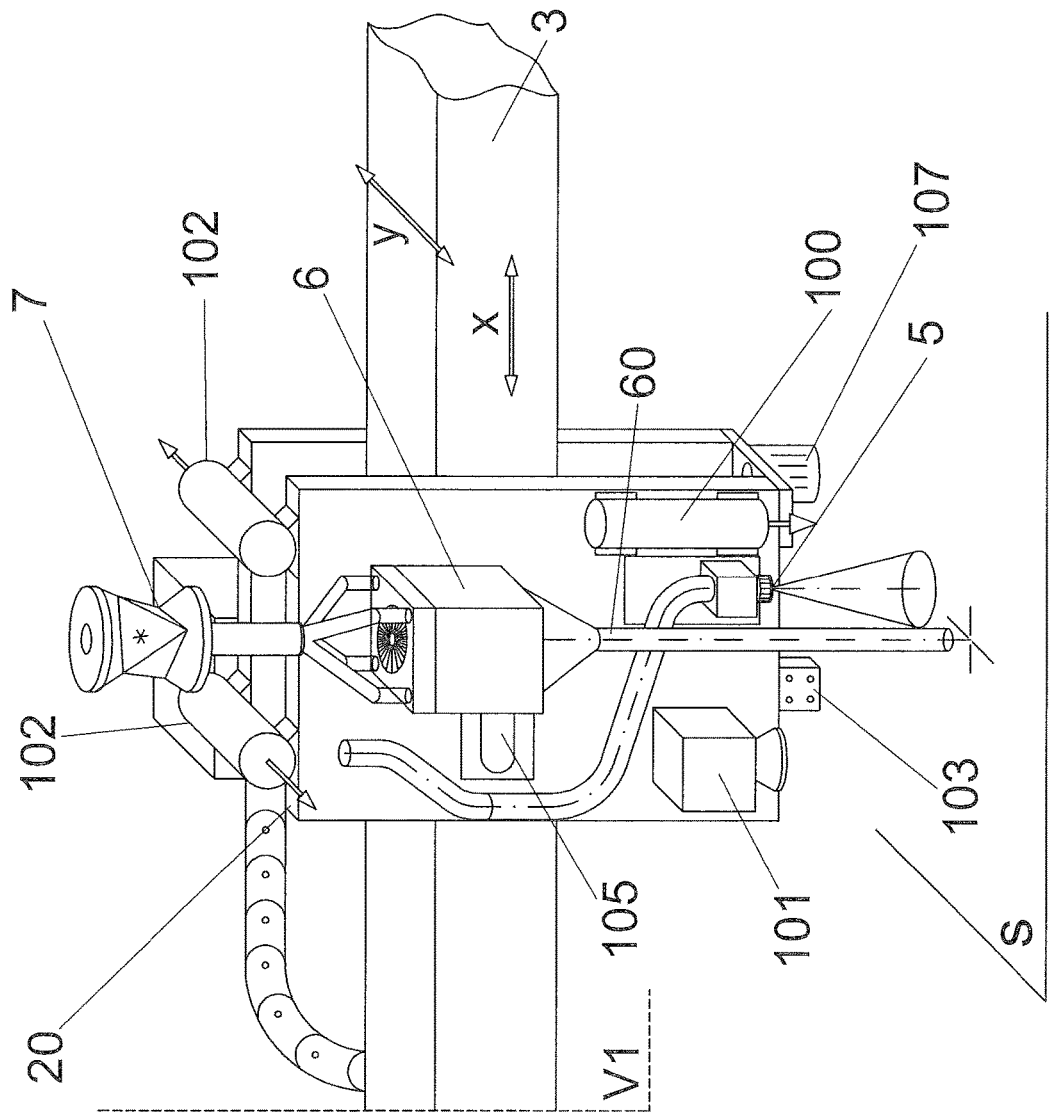
FIG. 4 is a more detailed perspective view of a marking support system or printer head of the embodiment of FIG. 3.

The system E comprises a series of security means that sends electronic command signals for preventing or stopping the functioning of the engraving laser 6 and advantageously also of the spraying device, when a security means detects a potential or actual danger. The security means are advantageously selected from the group consisting of:

- a distance detector 100 (see FIG. 4) between on one hand, the system or a part of this system (for example the support 20), particularly the engraving laser 6, and on the other hand, the surface of site S covered by the frame of the system;
- one or more cameras 101 (mounted on the support 20 near the spraying head 5 and the laser 6) to detect the presence of at least an object (for preventing cable damage) or pre-marked areas on the site surface covered by the frame of the system E;
- a smoke detector 103 (for detecting a fire or a fire risk, the support 20 may be equipped with a mini extinguisher system to stop the start of fire).
- an inclination detector 104 of the frame 1 with respect to the horizontal plan;
- an inclination or tilt detector 105 of the engraving laser 6 with respect to the vertical axis;
- a motion detector 106 of the frame 1;
- an infrared detector 107, for example to detect a source of heat or a reflecting element dangerously reflecting the laser beam;
- a presence or motion detector 108 (of an object, person or animal) at a distance of less than 2 m from the frame 1;
- a fault detector 109 in the electric circuit and/or in the electronic circuit 12 and/or in one of the motors 2A, 2B, 2C, 3A, 3B;
- a current leakage detector 110; including a series of electric fuse protectors.
- a wind detector 111; and
- an opening detector 112 of a cover/hood 113 (drawn as dashed lines), the latter pivoting for example around the axis 114. The cover/hood 113 is advantageously transparent or translucent, but preferably manufactured in a material adapted for blocking the passage of a laser beam at the emitted frequency by the engraving laser 6. Preferably, the cover 113 is made in an organic material (transparent or translucent) in which one or more organic absorbing color materials are dissolved and/or in a mineral material doped with one or more metal alloys or composite materials.

The frame 1 is advantageously mounted on positioning means 115 (like lift cylinders) to ensure that the frame 1 is stable in the desired plane (for example horizontal plane, or a plane parallel to the plane of the concrete slab). The positioning means 115 has for example an abutment which is moved vertically between a lifted or upwards position in which the abutment is away from the surface to be marked, enabling a movement of the frame 1 by the motor(s) 2A and/or 2B on the surface, and a downwards position in which the abutment contacts the surface to be marked, whereby preventing movement of the frame 1 on the said surface.

The marking support system 20 is mounted to be mobile on the frame at least in two perpendicular directions X, Y in the manner to cover a marking zone, at least rectangular with one or more sides of at least 0.2 m, advantageously at least 1.5 m, the marking zone covering a surface of at least 0.4 m², advantageously at least 1 m², preferably comprised between 1 and 2 m².

The marking support 20 includes one or more positioning cameras mounted thereon that can be the camera 101, said camera being then also able to detect angles or crosses formed by lines previously marked by the laser, during a scanning step of the support 20 in the two directions X, Y. The camera can also take picture or images of the spray step and the engraving step, said images being then suitable for a control of the printing operation.

The displacement system of the frame 1 comprises at least a series of wheels or continuous tracks each one driven by an electric motor. The wheels for example are situated on the same side as the platform 8 intended to support the paint reservoir 200 and the pump 201 to feed (via one or more tubes or pipes) the paint to be sprayed to the spraying head 5. The platform 8 can accommodate several paint reservoirs to make bands with different colours.

The marking device support 20 is mounted to be mobile in translation along a first direction X on a rail, the latter being mounted to be mobile in translation with respect to the frame along a second direction Y perpendicular to the first direction X.

The marking device support 20 comprises a carriage moveably mounted on the rail 3 that defines a vertical plane V1 (substantially symmetric to the plane of the rail 3) when the frame 1 is substantially horizontal, the carriage or support 20 having in relation to this vertical plane defined by the rail, on one side the engraving laser 6 with the topographic prism 7 supported above the engraving laser 6. Under the rail 3, and displaced laterally with respect to the laser 6, sits the spraying head 5.

To operate the engraving laser on a previously painted band, it is necessary to displace the rail 3 and/or the support 20 to bring the laser head just over the paint band. The offset values with respect to axes X and Y are approximately known during the conception of the system. The exact offset values between the prism position, the engraving laser and the spraying head are precisely recalculated during the calibration process. This calibration step is done by printing a same pattern in a same zone, after turning the frame 1 by about 180 degrees around the vertical axis. The topographic station helps in correct repositioning of the tracing pattern, the calibration is done by measuring the error as per X and Y. The correction to be made corresponds to half the distance in X and Y separating the patterns traced on the same position.

The engraving laser 6 comprises a laser beam guiding tube 60 oriented towards the site surface S to be marked. This tube is advantageously made of a laser beam absorbing material in case of reflection on the surface to trace.

The support 20 is equipped with two laser distance detectors 102 (at least one detector) that enable scanning of a horizontal area for the existing obstacles around the tracing zone. This distance reading is recalculated in the general coordinate system by using the prism position.

The frame 1 carries or is associated along one of its edges with a structure 8 (forming a bearing platform and a box) associated with at least one liquid or paint reservoir 200 (liquid or paint suitable to be burnt), and advantageously at least the battery or batteries 11 for supplying electric current to the electric motors and the pump 201, so as to position the centre of gravity of the system towards the said edge (in the embodiment of FIG. 3, the edge adjacent to the pivoting axis 114 of the cover 113), which is advantageously associated to a first wheel or continuous track 2 driven in movement by a first electric motor 2A and a second wheel or continuous track 2 driven in movement by a second electric motor 2B, the first wheel or continuous track being distant from the second wheel or continuous track.

This invention relates also to the use of a system according to the invention for topographic printing in actual size on a surface of a building construction site, in which successive portions S1,S2,S3,S4,S5,S6,S7,S8, etc. of the surface are each first printed with one or more paint bands or marking bands, followed with laser marking on one or more of said paint bands or marking bands. To simplify the frame position during its displacement for each portion of the surface, it is advantageous to trace/mark at least two laser reference marks R1, R2, etc. per tracing portion. The frame is then moved in such a manner so that the frame in which are moving the support 20 and the positioning camera 101 covers the preceding reference marks.

This invention is also capable of repositioning itself onto a previous tracing comprising minimum intersecting lines, even if said lines were not traced for the purpose of further repositioning. This means that the positioning camera is capable of recognising a previously marked zone for its precise repositioning. This case is useful when it is necessary to complete/correct a prior trace or marking. Indeed, the BIM is continuously amended with the project and the marking have to be amended or completed.

Figure 5:
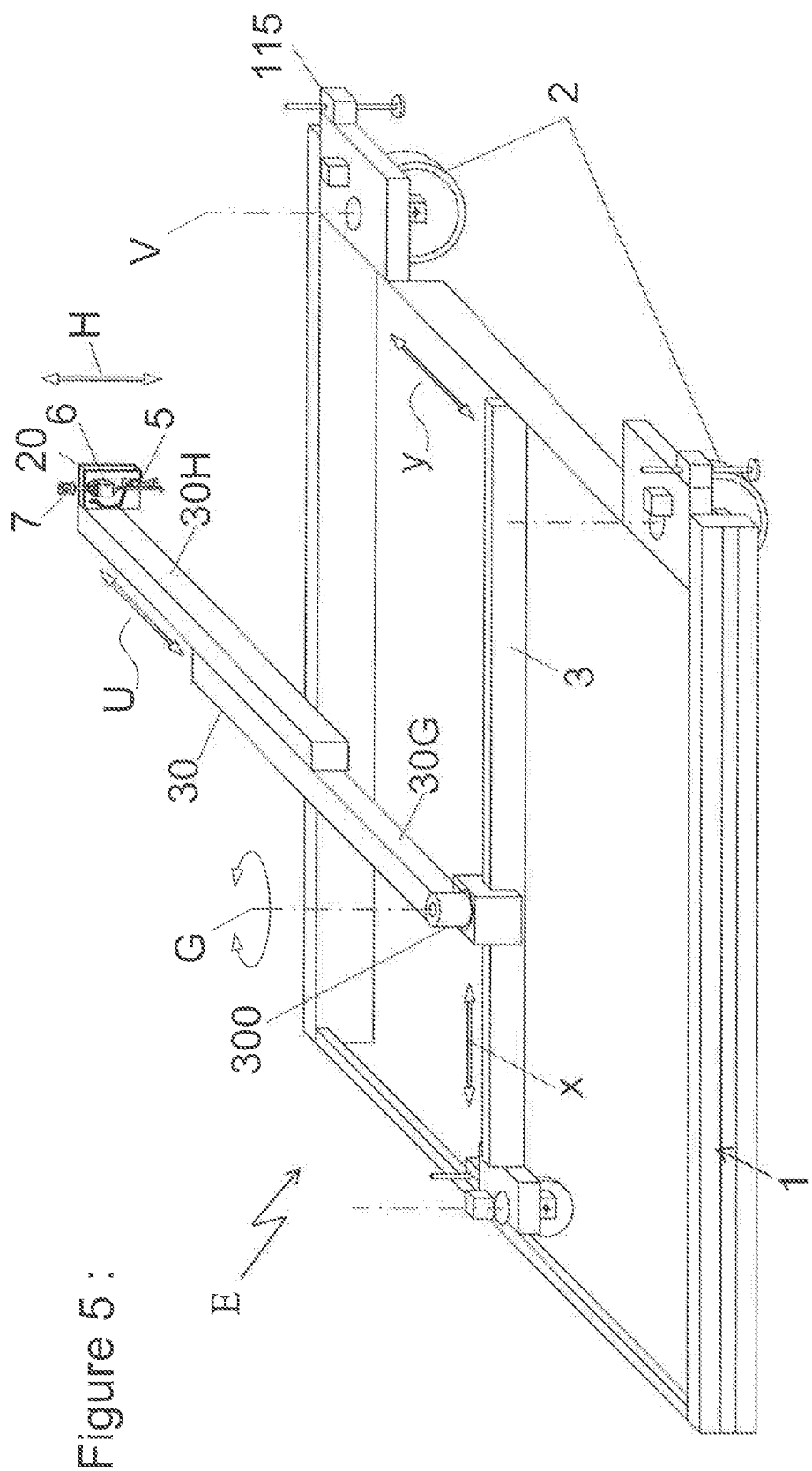
FIG. 5 is a perspective view of a further embodiment of a system of the invention.
Figure 6A:
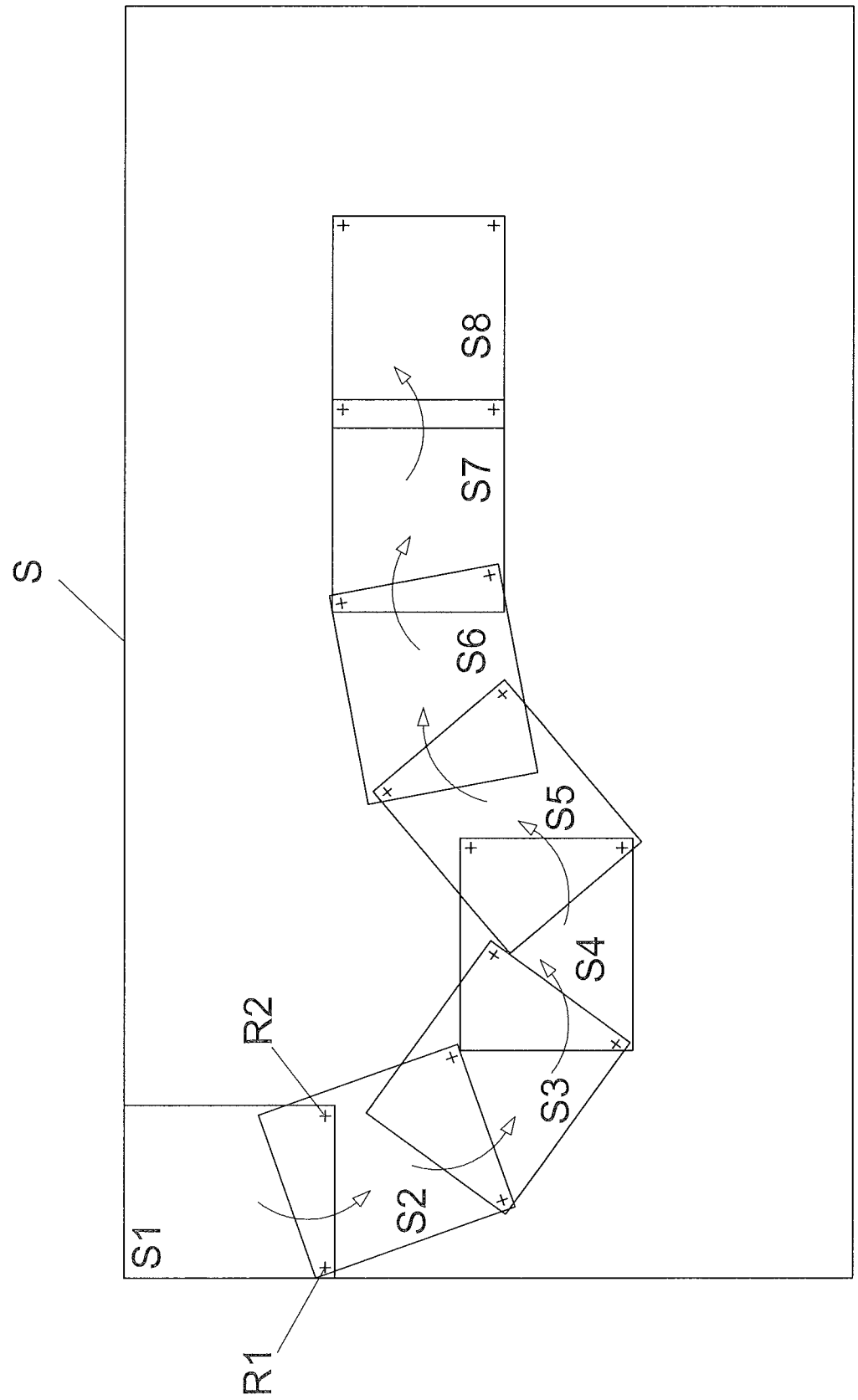

The topographic printer as per the invention shown in FIG. 5 is a system E of a actual size topographic printer on a site surface, where the system E comprises at least a non deformable movable frame 1, a displacement system 2 of the frame relative to the respective site, a marking system with a topographic prism, a support 20 for a marking system 5, 6 movable relative to the frame 1 at least in two perpendicular directions X, Y, in which the marking system comprises at least a spraying device 5 of a band of a paint or liquid suitable to be burnt and an engraving laser 6 for subjecting a portion of the sprayed band (on the site by the spraying device) to a burning step.

A displacement rail 30 for support 20 is fixed to a rotation system 300. The displacement rail 30 has two portions 30G, 30H which can be moved (direction U) the one with respect to the other for modifying the length of the rail 3 and thus the position of the support 20 with respect to the vertical axis of rotation G of the rotation system 300. The rotation system 300 is movably mounted along the rail 3 by a driving system (movement in the direction X), while the rail 3 is movably mounted with respect to the frame 1 by a driving system for enabling a movement in the direction Y of the rail 3. Said embodiment has the advantage of allowing the support 20 to be able to be moved all around the non-deformable frame 1, enabling tracing or marking in difficult or less-accessible zones and in and also outside the four sides of the frame 1. The support 20 might also be movable by a driving system in the direction H with respect to the displacement rail 30, so as to prevent the support 20 from abutting against the frame 1 when moving from a location of the support 20 within the rectangular zone defined by the frame 1 to a location of the support outside the said rectangular zone of the frame 1.

What is claimed is:

1. A topography marking system for marking in actual size at least some construction information on a construction surface, said system comprising at least:
   (a) a frame adapted to form a rigid non deformable frame,
   (b) a marking system,
   (c) a moving support for the marking system, said moving support being moveably mounted relative to the frame by a moving system associated to the frame or to an element thereof, said moving system being adapted for ensuring movement of the marking system with respect to the frame, within a substantially horizontal plane,
   (d) a displacement system for moving the frame relative to the construction surface,
   wherein said marking system comprises at least:
   (e) a spraying device adapted for spraying, during a spray operation, a painting composition suitable to be burnt, on said construction surface, so as to be able to paint on said construction surface at least one painted band;
   (f) an engraving laser adapted for directing a laser beam for burning, during a burning operation, said at least one painted band for marking on said at least one painted band construction information; and
   (g) at least one topographic prism.

2. The topography marking system of claim 1,
   wherein the displacement system for moving the frame relative to the construction surface comprises at least one frame moving electric motor,
   wherein the moving support comprises at least one support moving electric motor for controlling the movement of the support relative to the frame, and
   wherein the topography marking system is provided with at least one electric battery for supplying energy to the said at least one frame moving electric motor and the said at least one support moving electric motor.

3. The topography marking system of claim 1, comprising an electronic command system to command:
   the marking system for controlling working steps thereof;
   the moving system for controlling the position of the marking system relative to the frame; and
   the displacement system for controlling the position of the frame on the construction surface,
   wherein said electronic command system wirelessly receives information at least relating to the position of the topography marking system or part thereof on the said construction surface.

4. The topography marking system of claim 3, whereby the electronic command system is programmed with safety instructions for preventing the burning operation of the engraving laser and for preventing the spray operation of the spraying device during a movement of the frame by the displacement system on the construction surface, and instructions for preventing the burning operation of the engraving laser when spraying device is spraying the painting composition on the construction surface.

5. The topography marking system of claim 1, wherein the spraying device comprises a spraying head adapted to spray on the construction surface a painted band of width less than 5 cm, while the engraving laser comprises a head for directing a laser beam to burn on the painted band, at least one element selected from the group consisting of points with a diameter of less than 1 mm and lines with thickness size of less than 1 mm.

6. The topography marking system of claim 5, wherein the spraying device comprises a spraying head adapted to spray on the construction surface a painted band of width comprised between 0.5 and 2 cm.

7. The topography marking system of claim 1, comprising at least one security means able to send at least one security signal to the electronic command system selected among the group consisting of a security signal for stopping a burning operation by the engraving laser, a security signal for preventing a burning operation by the engraving laser, a security signal for stopping a spray operation by spraying device, a security signal for preventing a spray operation by the spraying device, and combinations thereof, whereby the security means also functions to stop or prevent the functioning of the spraying device, the said at least one security means is selected from the group consisting of:
- a distance detector adapted to determine a distance parameter between, on one hand, the topography marking system or a part of thereof, and, on the other hand, the construction surface;
- at least one detecting means selected among cameras and sensors adapted for detecting the presence of at least an object on a zone of the construction surface to be marked;
- a smoke detector adapted for detecting smoke generated by the burning operation;
- an inclination detector adapted for determining an inclination parameter of the frame with respect to a horizontal plane;
- an inclination or tilt detector adapted for determining a position parameter of the engraving laser with respect to a vertical axis;
- a motion detector adapted for determining the movement of the frame;
- an infrared detector adapted for determining the presence of a heat source or a reflecting element;
- a detector adapted for detecting the presence or movement of an object, person or animal at least in a zone within a distance of less than 2 m from the frame;
- a fault detector adapted for determining at least one fault selected among the group a fault in an electric circuit, a fault in the electronic circuit,
- a fault in the moving system, a fault in the displacement system, and
- combinations thereof;
- a current leakage detector;
- one or more electric fuse protectors;
- a wind detector; and
- a protection cover opening detector, and
- combinations thereof.

8. The topography marking system of claim 1, wherein the moving support for the marking system is moveably mounted in relation to the frame thereby enabling the moving support to move within a plane covering a substantially rectangular marking zone with sides of at least 0.2 m.

9. The topography marking system of claim 1, wherein the moving support for the marking system is moveably mounted in relation to the frame thereby enabling the moving support to move within a plane covering a substantially rectangular marking zone with sides of at least 1.5 m.

10. The topography system of claim 1, wherein the moving support of the marking system comprises at least one positioning camera.

11. The topography marking system of claim 1, wherein the displacement system for moving the frame comprises at least a series of wheels or rollers, whereby at least three of which are each driven by an electric motor.

12. The topography marking system of claim 1, wherein the moving support of the marking system is moveably mounted for translation in a first direction on a rail, whereby said rail is movably mounted for translation with respect to the frame in a second direction perpendicular to the first direction.

13. The topography marking system of claim 1, wherein the moving support of the marking system comprises a carriage moveably mounted on a rail associated to the frame, said carriage bearing a displacement rail with interposition of a controlled rotation system around an axis perpendicular to the frame, the displacement rail being associated with the moving support, whereby the displacement rail is associated with a control system for adapting the distance separating the moving support from said vertical axis, and whereby the spraying device borne by the moving support is displaced laterally with respect to the engraving laser.

14. The topography marking system of claim 1, wherein the engraving laser comprises of a laser beam guiding tube for guiding the laser beam generated by the engraving laser towards the construction surface.

15. The topography marking system of claim 1, wherein the moving support is equipped with at least two laser detectors adapted for detecting obstacles on or around a marking zone of the construction surface.

16. The topography marking system of claim 1, wherein the frame is provided along one of its edges, with a structure provided with at least one element selected among the group consisting of a paint reservoir for the painting composition suitable to be sprayed, one or more electric batteries for supplying electric power to at least the moving support, the displacement system and the engraving laser, and combination thereof, whereby the topography marking system has a centre of gravity located towards said one of its edges associated with the said structure.

17. The topography marking system of claim 16, wherein said one of its edges associated with said structure is associated with a first wheel or continuous track adapted to be driven by at least one first electric motor, and with a second wheel or continuous track adapted to be driven by at least a second electric motor, the first wheel or continuous track being distant from the second wheel or continuous track.

18. The topography marking system of claim 1, wherein the frame is provided with a protecting cover.

19. A process for marking in actual size at least some construction information on a construction surface by at least one topography marking system, whereby the topography marking system comprises at least:
  (a) a frame adapted to form a rigid non deformable frame,
  (b) a marking system,
  (c) a moving support for the marking system, said moving support being mounted movable relative to the frame by a moving system associated with the frame or with an element thereof, said moving system being adapted for ensuring movement of the marking system with respect to the frame, within a substantially horizontal plane,
  (d) a displacement system for moving the frame relative to the construction surface,
  wherein said marking system comprises at least:
  (e) a spraying device wherein a spray operation is adapted for spraying a painting composition suitable to be burnt, on said construction surface, so as to be able to paint on said construction surface at least one painted band;
  (f) an engraving laser which in a burning operation is adapted for directing a laser beam for burning the said at least one painted band for marking on the said at least one painted band construction information; and
  (g) at least one topographic prism,
  wherein the topography marking system further comprises at least a control system for controlling the working of the moving system, the working of the displacement system, the spray operation of the spraying device, and the burning operation of the engraving laser;
  whereby said process comprises at least the following steps:

sending information to the topography marking system with the construction information to be marked on a series of marking zones of the construction surface, moving the frame of the topography marking system successively from one marking zone of a series of marking zones to another marking zone of the series of marking zones, in accordance with the information sent; and for each marking zone of the series of marking zones, moving the moving support with the marking system on the construction surface, while controlling first the spray operation for painting on said one marking zone at least one painted band and then the burning operation by the engraving laser by directing laser beam onto the said at least one painted band for marking construction information on said at least one painted band of said one marking zone.

20. The process of claim 19, wherein the spray operation is controlled for spraying at least one painted band with a width less than 5 cm, while the burning operation is controlled for burning on said at least one painted band, at least one element selected from the group consisting of points with a diameter of less than 1 mm and lines with thickness size of less than 1 mm.

21. The process of claim 19, wherein the at least one topography marking system comprises at least one security means selected from the group consisting of:

a distance detector adapted to determine a distance parameter between, on one hand, the topography marking system or a part of thereof, and, on the other hand, the construction surface;

at least one detecting means selected among cameras and sensors adapted for detecting the presence of at least an object on a zone of the construction surface to be marked;

a smoke detector adapted for detecting smoke generated by a burning operation;

an inclination detector adapted for determining an inclination parameter of the frame with respect to a horizontal plane;

an inclination or tilt detector adapted for determining a position parameter of the engraving laser with respect to a vertical axis;

a motion detector adapted for determining the movement of the frame;

an infrared detector adapted for determining the presence of a heat source or a reflecting element;

a detector adapted for detecting the presence or movement of an object, person or animal at least in a zone within a distance of less than 2 m from the frame;

a fault detector adapted for determining at least one fault selected among the group a fault in an electric circuit, a fault in the electronic circuit, a fault in the moving system, a fault in the displacement system, and combinations thereof;

a current leakage detector;

one or more electric fuse protectors;

a wind detector; and a protection cover opening detector, and combinations thereof, whereby after determination of a security risk by the at least one security means, the said at least one security means emits at least one security signal to the topography marking system selected among the group consisting of a security signal for stopping a burning operation by the engraving laser, a security signal for preventing a burning operation by the engraving laser, a security signal for stopping a spray operation by spraying device, a security signal for preventing a spray operation by the spraying device, and combinations thereof.

* * * * *